(12) United States Patent
Tiwari

(10) Patent No.: US 12,462,940 B2
(45) Date of Patent: Nov. 4, 2025

(54) VEHICLE OCCUPANT HEALTH RISK ASSESSMENT SYSTEM

(71) Applicant: Toyota Motor Engineering & Manufacturing North America, Inc., Plano, TX (US)

(72) Inventor: Prashant Tiwari, Santa Clara, CA (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 1003 days.

(21) Appl. No.: 16/935,616

(22) Filed: Jul. 22, 2020

(65) Prior Publication Data
US 2022/0028556 A1    Jan. 27, 2022

(51) Int. Cl.
| | | |
|---|---|---|
| G16H 50/30 | (2018.01) | |
| A61B 5/00 | (2006.01) | |
| B60W 40/08 | (2012.01) | |
| B60W 60/00 | (2020.01) | |
| G16H 50/80 | (2018.01) | |

(52) U.S. Cl.
CPC .......... *G16H 50/30* (2018.01); *A61B 5/6893* (2013.01); *A61B 5/7275* (2013.01); *B60W 40/08* (2013.01); *B60W 60/0024* (2020.02); *G16H 50/80* (2018.01); *B60W 2040/0881* (2013.01); *B60W 2540/221* (2020.02); *B60W 2556/10* (2020.02)

(58) Field of Classification Search
CPC ... G16H 50/30; G16H 50/80; B60W 60/0024; B60W 40/08; B60W 2556/10; B60W 2540/221; B60W 2040/0881; A61B 5/6893; A61B 5/7275

USPC .......................................................... 705/2
See application file for complete search history.

(56) References Cited

U.S. PATENT DOCUMENTS

| | | |
|---|---|---|
| 7,887,089 B2 | 2/2011 | Breed et al. |
| 8,595,161 B2 | 11/2013 | Bearman et al. |
| 8,725,311 B1 | 5/2014 | Breed |

(Continued)

OTHER PUBLICATIONS

National Chlamydia Screening Programme, Text Messaging for Test Results Communication Within the National Chlamydia Screening Programme, May 2016 (Year: 2016).*

(Continued)

*Primary Examiner* — Peter H Choi
*Assistant Examiner* — Rachael Sojin Stone
(74) *Attorney, Agent, or Firm* — Christopher G. Darrow; Darrow Mustafa PC

(57) ABSTRACT

A health risk assessment system for estimating a health risk posed by transporting a user in a vehicle. The system includes one or more processors and a memory communicably coupled to the one or more processors and storing a health risk assessment module. The health risk assessment module includes computer-readable instructions that when executed by the one or more processors cause the one or more processors to attempt to acquire information regarding a travel history of the user. The module is also configured to, using acquired travel history information, determine a value of a first health status parameter and to compare the value of the first health status parameter to a first threshold. Responsive to the value of the first health status parameter exceeding the threshold, the module controls operation of the vehicle to implement at least one infection prevention measure.

19 Claims, 4 Drawing Sheets

(56) References Cited

U.S. PATENT DOCUMENTS

| | | | | |
|---|---|---|---|---|
| 10,156,848 | B1* | 12/2018 | Konrardy | G07C 5/0808 |
| 10,210,409 | B1 | 2/2019 | Migneco et al. | |
| 10,282,625 | B1* | 5/2019 | Wengreen | G01C 21/3484 |
| 10,327,705 | B2 | 6/2019 | Weidl et al. | |
| 10,467,488 | B2 | 11/2019 | Sicconi et al. | |
| 11,127,506 | B1* | 9/2021 | Jain | H04W 4/021 |
| 11,142,211 | B1* | 10/2021 | Makilya | G06V 30/226 |
| 11,318,960 | B1* | 5/2022 | McKnew | G06V 20/59 |
| 11,456,080 | B1* | 9/2022 | Jain | A61B 5/4815 |
| 11,504,011 | B1* | 11/2022 | Jain | G06N 5/04 |
| 2006/0036619 | A1 | 2/2006 | Fuerst et al. | |
| 2008/0003136 | A1* | 1/2008 | White | A61L 2/22 |
| | | | | 422/62 |
| 2009/0070134 | A1 | 3/2009 | Rodgers | |
| 2011/0161121 | A1* | 6/2011 | Nagpal | G06Q 10/02 |
| | | | | 705/5 |
| 2012/0078063 | A1* | 3/2012 | Moore-Ede | G16H 10/20 |
| | | | | 600/300 |
| 2013/0231582 | A1 | 9/2013 | Prasad | |
| 2014/0275834 | A1 | 9/2014 | Bennett | |
| 2014/0306826 | A1 | 10/2014 | Ricci | |
| 2016/0249853 | A1* | 9/2016 | Ricci | B60W 50/14 |
| | | | | 340/870.07 |
| 2017/0202991 | A1* | 7/2017 | Childress | A61L 2/10 |
| 2017/0209102 | A1 | 7/2017 | Parthasarathy et al. | |
| 2017/0247037 | A1 | 8/2017 | Basir et al. | |
| 2018/0174457 | A1 | 6/2018 | Taylor | |
| 2019/0061772 | A1 | 2/2019 | Prinz | |
| 2019/0340906 | A1 | 11/2019 | Williams | |
| 2019/0354112 | A1* | 11/2019 | Zhang | G08G 1/127 |
| 2019/0359220 | A1 | 11/2019 | Wilson | |
| 2020/0061223 | A1* | 2/2020 | Hallack | A61L 2/24 |
| 2020/0301414 | A1* | 9/2020 | Schwie | B60W 30/18 |
| 2020/0349666 | A1* | 11/2020 | Hodge | G01C 21/3602 |
| 2022/0129999 | A1* | 4/2022 | Locke | G06Q 10/10 |
| 2022/0148689 | A1* | 5/2022 | Gill | G16H 10/60 |
| 2022/0176779 | A1* | 6/2022 | Ghannam | G06V 10/143 |
| 2022/0319660 | A1* | 10/2022 | Belanger-Basset | G06V 40/28 |
| 2022/0371604 | A1* | 11/2022 | Katti | B60W 40/08 |
| 2023/0211797 | A1* | 7/2023 | Lee | B60W 50/0098 |
| | | | | 701/36 |

OTHER PUBLICATIONS

Dietz L, Horve PF, Coil DA, Fretz MEisen JA, Van Den Wymelenberg K2020.2019 Novel Coronavirus (COVID-19) Pandemic: Built Environment Considerations To Reduce Transmission. mSystems5:10.1128/msystems.00245-20.https://doi.org/10.1128/msystems.00245-20 (Year: 2019).*

* cited by examiner

VEHICLE OCCUPANT HEALTH RISK ASSESSMENT SYSTEM

TECHNICAL FIELD

The subject matter described herein relates to systems for assessing health risks to vehicle occupants and, more particularly, to a system for assessing a health risk to a current or prospective vehicle occupant arising from possible exposure of the vehicle to previous riders infected with a communicable disease.

BACKGROUND

The transmission of infectious diseases and ways to mitigate such transmission are growing concerns. In vehicles such as MaaS ("mobility as a service") vehicles and rental cars, a wide variety of users from different locations may drive or ride in the vehicles. Riders who are infected with a communicable disease may transmit such diseases by, for example, touching interior surfaces of the vehicles and by coughing and/or sneezing inside the vehicles, thereby depositing bacteria and/or viruses on vehicle surfaces. Subsequent occupants of the vehicles may touch these surfaces before the vehicle interior has been sanitized, thereby possible infecting the occupants and spreading disease.

SUMMARY

In one aspect of the embodiments described herein, a health risk assessment system is provided for estimating a health risk posed by transporting a user in a vehicle. The system includes one or more processors and a memory communicably coupled to the one or more processors and storing a health risk assessment module. The health risk assessment module includes computer-readable instructions that when executed by the one or more processors cause the one or more processors to attempt to acquire information regarding a travel history of the user. The module is also configured to, using acquired travel history information, determine a value of a first health status parameter. The module is also configured to compare the value of the first health status parameter to a first threshold. Responsive to the value of the first health status parameter exceeding the threshold, the module controls operation of the vehicle to implement at least one infection prevention measure.

In another aspect of the embodiments described herein, a non-transitory computer-readable medium is provided for estimating a health risk posed by transporting a user in a vehicle. The medium stores instructions that when executed by one or more processors cause the one or more processors to attempt to acquire information regarding a travel history of the user. Stored instructions may also cause the one or more processors to, using acquired travel history information, determine a value of a first health status parameter. Stored instructions may also cause the one or more processors to compare the value of the first health status parameter to a first threshold, and responsive to the value of the first health status parameter exceeding the threshold, control operation of the vehicle to implement at least one infection prevention measure.

In another aspect of the embodiments described herein, a method is provided for estimating a health risk posed by transporting a user in a vehicle. The method includes steps of acquiring information regarding a travel history of the user and, using acquired travel history information, determining a value of a first health status parameter. The method also includes a step of comparing the value of the first health status parameter to a first threshold. Responsive to the value of the first health status parameter exceeding the threshold, operation of the vehicle is controlled to implement at least one infection prevention measure. Responsive to the value of the first health status parameter not exceeding the threshold, operation of the vehicle is controlled to generate a message configured to indicate that no infection prevention measure is required.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Embodiments described herein relate to a health risk assessment system for estimating a health risk posed by transporting a user in a vehicle. The system includes one or more processors and a memory communicably coupled to the one or more processors and storing a health risk assessment module. The health risk assessment module is configured to attempt to acquire information regarding a travel history of the user. The module is also configured to, using acquired travel history information, determine a value of a first health status parameter. The first health status parameter represents an estimated likelihood that the user became infected with a communicable disease by previously riding in another vehicle that was also occupied, either before being occupied by the user or contemporaneously with being occupied by the user, by another person who was infected or contagious with the communicable disease. The module is also configured to compare the value of the first health status parameter to a first threshold. The module is also configured to, responsive to the value of the first health status parameter exceeding the threshold, control operation of the vehicle to implement at least one infection prevention measure directed to preventing other current occupants of the vehicle and future occupants of the vehicle from becoming infected.

Figure 1:
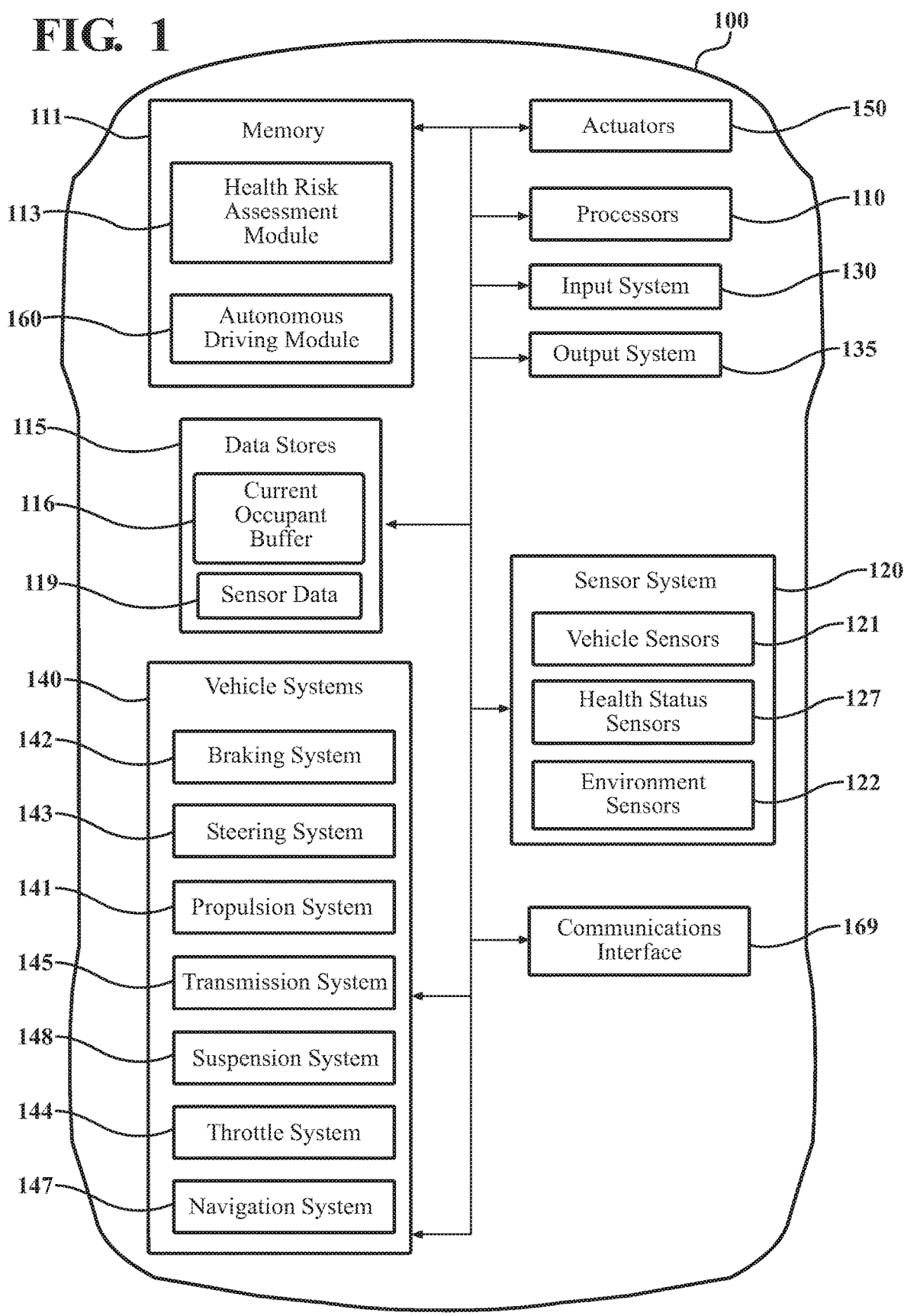
FIG. 1 is a block schematic diagram of a vehicle incorporating elements of a health risk assessment system for estimating a health risk posed by transporting a user in a vehicle, in accordance with embodiments described herein.

FIG. 1 is a block schematic diagram of a vehicle incorporating elements of a health risk assessment system for estimating a health risk posed by transporting a user in a vehicle, in accordance with embodiments described herein. As used herein, a "vehicle" is any form of motorized transport. In one or more implementations, the vehicle 100 is passenger vehicle such as a sedan. While arrangements will be described herein with respect to passenger vehicles, it will be understood that embodiments are not limited to conventional passenger vehicles. In some implementations, the vehicle 100 may be any form of motorized transport that may benefit from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described with reference thereto. Additionally, it will be appreciated that for simplicity and clarity of illustration, where appropriate, reference numerals may have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

FIG. 1 shows a block schematic diagram of a vehicle 100 incorporating a health risk assessment system in accordance with an embodiment described herein. In some instances, the vehicle 100 may be configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that can operate in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor(s) of the vehicle 100. For instance, the processor(s) 110 can be an electronic control unit (ECU). The vehicle 100 can include one or more data store(s) 115 for storing one or more types of data. The data store(s) 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operably connected to the processor(s) 110 for use thereby. The term "operably connected," as used throughout this description, can include direct or indirect connections, including connections without direct physical contact.

In one or more arrangements, the one or more data store(s) 115 can include a current vehicle occupant buffer 116. The current vehicle occupant buffer 116 may locally store for processing any information relating to each current vehicle occupant which is pertinent to the user health status determinations described herein. For example, the current vehicle occupant buffer 116 may store travel history information downloaded from resources located on the cloud 210 (FIG. 2), such as user travel history information database 212 or any other travel history information source. The current vehicle occupant buffer 116 may also store data acquired by vehicle health status sensors 127 through physical contact with the user or monitoring of user actions or behaviors. The health risk assessment module 113 (described in greater detail below) may analyze and/or process the information stored on the current vehicle occupant buffer 116 along with other needed and/or available information to estimate a health risk posed by transporting the occupant or user. In one or more arrangements, the available information relating to each user may be collected and stored locally in the current vehicle occupant buffer 116 to speed information processing and to obviate potential wireless connection difficulties when interacting with the cloud 210 and/or other extra-vehicular information sources.

As used herein, "acquire" means to obtain by any means. For example, information may be acquired by the health risk assessment module 113 responsive to a direct request generated by the module. In addition, information may be acquired by the health risk assessment module 113 by the module receiving information responsive to a standing instruction to forward such information to the module or to a memory in operable communication with the module. Similarly, data may be acquired or obtained by vehicle health status sensors 127 either passively (e.g., through receipt of images by a camera) or actively (by radar scans of the vehicle interior).

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more health status sensors 127 of the sensor system 120.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system 120 can include any suitable type of sensor. Various examples of different types of sensors will be described herein. However, it will be understood that the embodiments are not limited to the particular sensors described.

Various examples of sensors of the sensor system 120 are described herein. The example sensors may be part of the one or more environment sensors 122, one or more of the health status sensors 127, or the one or more vehicle sensors 121. However, it will be understood that the embodiments are not limited to the particular sensors described. The sensor system 120 may include any sensors suitable for and/or required to perform any of the data acquisition and/or vehicle control operations contemplated herein. As an example, in one or more arrangements, the environment sensors 122 can include one or more radar sensors, one or more LIDAR sensors, one or more sonar sensors, and/or one or more exterior cameras. In one or more arrangements, the one or more cameras 126 can be high dynamic range (HDR) cameras or infrared (IR) cameras.

The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100, such as the current geographical location of the vehicle. In one or more arrangements, the vehicle sensor(s) 121 can include a speedometer to determine a current speed of the vehicle 100. The vehicle sensor(s) 121 may include vehicle directional sensors configured to determine a current heading of the vehicle or direction in which the vehicle is pointed.

The sensor system 120 can include one or more health status sensor(s) 127. The health status sensor(s) 127 can detect, determine, and/or sense information relating to a health condition of an occupant of the vehicle 100. In one or more arrangements, health status sensor(s) 127 may include biometric sensors configured to identify and/or record characteristics associated with a user. Biometric sensors can include at least one of image sensors, IR sensors, weight sensors, load cells, force transducers, heart rate monitors, blood pressure monitors, and the like. Health status sensors may be configured to measure values of parameters such as body temperature, blood pressure, pulse rate, respiratory rate, and other vital signs.

Health status sensor(s) 127 may be configured to acquire data through direct physical contact with a vehicle occupant and/or to acquire data remotely, for example through observation and/or remote detection of occupant behaviors, motions, sounds, etc. Health status sensor(s) 127 may be incorporated into any suitable portion of the vehicle. In one or more arrangements, health status sensors configured to acquire data through direct physical contact with a vehicle occupant may be mounted in vehicle seat(s), interior door handle(s), door and/or window lock(s) and other manually-actuated control(s), the steering wheel, elements of the vehicle control console, and/or any other vehicle element or surface which may be touched by a user while inside the vehicle. For example, suitable steering wheel user sensors may be configured to measure heart rate, temperature, blood pressure, sweat, pulse rate, and/or other parameters of a vehicle occupant in contact with the steering wheel. Temperature sensors may detect elevated body temperature indicative of a fever and possible infection. In one or more arrangements, seat sensors may provide health telemetry via one or more of load cells, force transducers, weight sensors, moisture detection sensors, electrical conductivity/resistance sensors, and the like. Seat sensors may detect the presence of occupant(s) in one or more vehicle seats, and may detect unusual and/or frequent movement of an occupant while in the seat. For example, the seat sensors may detect that a user is "fidgeting" or moving in an unusual manner. Such movement may be indicative of physical pain or discomfort.

The health status sensors 127 may include one or more of optical or image sensors (e.g., cameras, etc.), microphones, motion sensors (e.g., utilizing RF, IR, and/or other sound/image sensing, etc.) and other sensors configured to detect characteristics of occupant movement and/or behavior. Exterior and interior sound receivers (e.g., a microphone or other type of acoustic-to-electric transducer or sensor) may be configured to receive and convert sound waves into equivalent analog or digital signals. The health status sensors 127 may be configured to detect and interpret sounds, motions and/or behaviors such as coughing and/or sneezing that may be indicative of illness.

In addition, the sensor system 120 can include one or more environment sensors 122 configured to acquire, and/or sense driving environment data. "Driving environment data" includes data or information about the external environment in which the vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, weather conditions, etc.

The vehicle 100 can include an input system 130. An "input system" includes any device, component, system, element or arrangement or groups thereof that enable information/data to be entered into a machine. For example, the input system 130 may include a keypad, a touch screen or other interactive display, a voice-recognition system and/or any other device or system which facilitates communications between a user and the vehicle. The input system 130 can receive an input from a vehicle passenger (e.g., a driver or a passenger) or a user located remotely from the vehicle 100. The vehicle 100 can also include an output system 135. An "output system" includes any device, component, or arrangement or groups thereof that enable information/data to be presented to a vehicle passenger (e.g., a person, a vehicle passenger, etc.) or a remote user.

The vehicle 100 can include one or more vehicle systems, collectively designated 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle systems 140 can include a propulsion system 141, a braking system 142, a steering system 143, throttle system 144, a suspension system 148, a transmission system 145, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system. The navigation system 147 may be configured to operate in conjunction with the autonomous driving module to guide the vehicle along a planned route.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor (s) 110, the autonomous driving module(s) 160, and/or the health risk assessment module 113. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor (s) 110 is operably connected. The modules can include instructions (e.g., program logic) executable by one or more processor(s) 110. Alternatively, or in addition, one or more of data store(s) 115 may contain such instructions.

Generally, module, as used herein, includes routines, programs, objects, components, data structures, and so on that perform particular tasks or implement particular data types. In further aspects, a memory (such as memory 111) generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc. The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120 and/or information received from a navigation system, such as navigation system 147. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

The processor(s) 110 and the autonomous driving module (s) 160 can be operably connected to communicate with the other elements of the vehicle, including various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140 and, thus, may be partially or fully autonomous.

The processor(s) 110 and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). The autonomous driving module(s) 160 may be configured to autonomously control the user vehicle so as to drive the vehicle to a selected destination.

The vehicle 100 can include a health risk assessment module 113. The health risk assessment module 113 may include computer-readable instructions that when executed by the processor(s) 110 cause the processor(s) 110 to attempt to acquire information regarding a travel history of the user and, using acquired travel history information, determine a value of a first health status parameter. The first health status parameter may represent a probability or likelihood that the user became infected during a previous ride with a communicable disease by riding in another vehicle that was also occupied, either before being occupied by the user or contemporaneously with being occupied by the user, by another person who was infected or contagious with the communicable disease. A user thus infected may infect a driver or other current occupant of the vehicle 100 or may spread bacteria or a virus to interior surfaces of the vehicle 100, which may infect a future occupant of the vehicle. In one or more arrangements, an algorithm for calculating the value of the first health status parameter may be configured so that circumstances that indicate an increased probability that the user might be infected will tend to increase the calculated value of the first health status parameter.

The health risk assessment module 113 may include computer-readable instructions that when executed by the processor(s) 110 cause the processor(s) to compare the value of the first health status parameter to a first threshold. The health risk assessment module 113 may include computer-readable instructions that when executed by the processor(s) 110 cause the processor(s) to, responsive to the value of the first parameter exceeding the threshold, control operation of the vehicle 100 to implement at least one infection prevention measure. An "infection prevention measure" may be a measure designed to prevent (or aid in preventing) another person from becoming infected by a communicable disease carried by (or potentially carried by) the user. For example, in one or more arrangements, one infection prevention measure may be for the vehicle 100 to autonomously drive itself to a disinfection facility after a user has exited the vehicle. In another example, operation of the vehicle may be controlled to generate a message recommending that a driver who will drive the user during the scheduled ride wear a mask and gloves while the user is in the vehicle and after the user leaves the vehicle until the vehicle can be disinfected.

In a particular example, the infection prevention measure may include generation by the vehicle 100 of an alert message configured to be perceivable by a prospective vehicle occupant. For example, the vehicle 100 may have recently been vacated by a user who has a relatively high probability of being infected, and the vehicle 100 may not have been adequately disinfected prior to picking up another scheduled ride. In addition, it may not have been possible to re-schedule the next user's ride. In this case, an audible alert may be generated and directed to the prospective user when the user reaches the vehicle 100 but before the user enters the vehicle. The prospective user may then have the options of declining the ride or taking other measures. In another example, infection prevention measure may include generation of an automated message to a scheduling facility canceling a scheduled vehicle rental or a ride of a prospective user if a first health status parameter associated with the user is determined to exceed a first threshold. The message may also be forwarded to the prospective user to allow the user to schedule a ride with another vehicle.

In one or more arrangements, the thresholds for the first and second health status parameters described herein may be defined or set by a vehicle driver, management of the transportation system, or another entity. The health risk assessment module 113 may include computer-readable instructions that when executed by the processor(s) 110 cause the processor(s) to generate any of a variety of audible and/or visual alerts and messages directed to informing vehicle occupants, prospective occupants, and/or other entities that a first health status parameter related to a particular user or prospective user above the first threshold, indicating that infection prevention measures may be called for. Generally, in embodiments described herein, the greater the determined value of the first health status parameter, the greater the estimated likelihood that a particular user became infected with a communicable disease by riding in another vehicle that was also occupied, either before being occupied by the user or contemporaneously with being occupied by the user, by another person who was infected or contagious with the communicable disease.

The health risk assessment module 113 may include computer-readable instructions that when executed by the processor(s) 110 cause the processor(s) to attempt to acquire information regarding a travel history of the user. For example, in one aspect, the health risk assessment module 113 may be configured to attempt to acquire information regarding any other rides the user took prior to the ride currently scheduled in the vehicle 100. To acquire other (previous) travel information of the user, the health risk assessment module 113 may cause one or more queries to be generated to the cloud vehicle travel information database 212 and/or other possible sources of vehicle travel information. In the database 212, the user's name, address and/or other personal information may be associated with information regarding all rides the user has previously taken in vehicles registered as part of the transportation system 202.

In one or more arrangements, the health risk assessment module 113 may include computer-readable instructions that when executed by the processor(s) 110 cause the processor (s) to attempt to determine, for each previous ride the user took, if a time period (i.e., a "ride gap") between the user's occupation of a vehicle during the previous ride and the last occupation of the vehicle by another person (including a separate human driver) prior to the user's previous ride was greater than a first predetermined time period. The first predetermined time period may be based on, for example, an estimated length of time bacteria or viruses may remain alive on a surface of the vehicle so that the user could be infected by touching a portion of the vehicle previously touched by an infected person. For example, if the user took a previous ride in a vehicle one day ago, the only occupant of the previously-ridden vehicle prior to the user's previous ride was in the vehicle twelve days ago, and an estimated length of time for surface contagion of a selected communicable disease is three days, the health risk assessment module may be configured to assume that, even if an infected occupant was transported in the vehicle prior to the user's previous ride, any surfaces of the vehicle contacted by the occupant would no longer have been contagious by the time of the user's previous ride. Thus, a situation where the ride gap exceeds the first predetermined time period would tend to lower the value of the calculated first health status parameter, while a situation where the ride gap does not exceed the first predetermined time period would tend to raise the value of the calculated first health status parameter.

In another aspect, the health risk assessment module 113 may include computer-readable instructions that when executed by the processor(s) 110 cause the processor(s) to attempt to determine, for each previous ride the user took, if a vehicle in which the previous ride occurred was disinfected after being occupied by a last occupant of the vehicle prior to the user occupying the vehicle for the previous ride. If the vehicle in which the user's previous ride occurred was disinfected after being used by the person prior to the user and the vehicle was thereafter not occupied until the user took the user's previous ride, then there should have been be no opportunity for the surfaces of the vehicle to become contaminated by another person prior to the previous ride by the user. This would decrease the risk that the user may be infected by contact with a vehicle that previously transported an infected person.

In one or more arrangements, the health risk assessment module 113 may include computer-readable instructions that when executed by the processor(s) 110 cause the processor (s) to attempt to acquire, for each previous ride the user took, information regarding whether or not the user shared the previous ride with any other person(s). Shared ridership information may be acquired from records indicating the dates and time when other riders entered and left the vehicle. The records may be processed to detect simultaneous occupancy of a vehicle by the user and one or more other person(s). If any of the user's previous rides were shared, this may increase the likelihood that the user was infected during the previous ride. This condition may act to increase the value of the first health status parameter. In addition, if the previous ride was shared with multiple people simultaneously, the value of the first health status parameter may increase with each additional person that the ride was shared with.

In one or more arrangements, the health risk assessment module 113 may include computer-readable instructions that when executed by the processor(s) 110 cause the processor (s) to attempt to acquire, for each previous ride the user took, at least an address of each other person who rode in a vehicle in which the previous ride occurred prior to the user riding in the vehicle, and a location at which the other person entered the vehicle. The address of the other person or shared rider may be pertinent to likelihood of user infection in that the other person may reside in a geographical area having a relatively high incidence of confirmed cases of the infectious disease. If the other person lives in a geographical area having a relatively high incidence of confirmed cases of the infectious disease, this fact may tend to raise the determined value of the first health status parameter. Similarly, if the other person entered the vehicle containing the user at a location having a relatively high incidence of confirmed cases of the infectious disease, It may be more likely that the other person came into contact with an infected person or object prior to entering the vehicle, due to any time spent waiting for the shared vehicle to arrive for pickup. This condition may also tend to raise the determined value of the first health status parameter.

In another aspect of the health risk assessment system, the health risk assessment module 113 may include computer-readable instructions that when executed by the processor(s) 110 cause the processor(s) to, using data from vehicle health status sensors 127, determine a value of a second health status parameter representing an estimated likelihood that one or more current occupants of the vehicle 100 is symptomatic or currently infected with a possibly contagious illness. For example, the health risk assessment module 113 may be configured to interpret images and/or sounds received by the health status sensors to detect sounds of coughing, sneezing, visible signs of fatigue, and/or other indications of possible illness. The health risk assessment module 113 may be configured to interpret an elevated temperature of a user as a fever.

Generally, in embodiments described herein, the greater the determined value of the second health status parameter, the greater the estimated likelihood that a particular user is symptomatic or currently infected with a possibly contagious illness. The health risk assessment module 113 may be configured to implement an algorithm designed to analyze, weight and/or integrate data from the health status sensors to generate a value for the second health status parameter based on measured and/or observed user biometric and health status sensor information. The health risk assessment module 113 may then compare the value of the second health status parameter to a second threshold. Responsive to the value of the second health status parameter exceeding the second threshold, the health risk assessment module 113 may then control operation of the vehicle 100 to implement at least one infection prevention measure as described herein.

Figure 2:
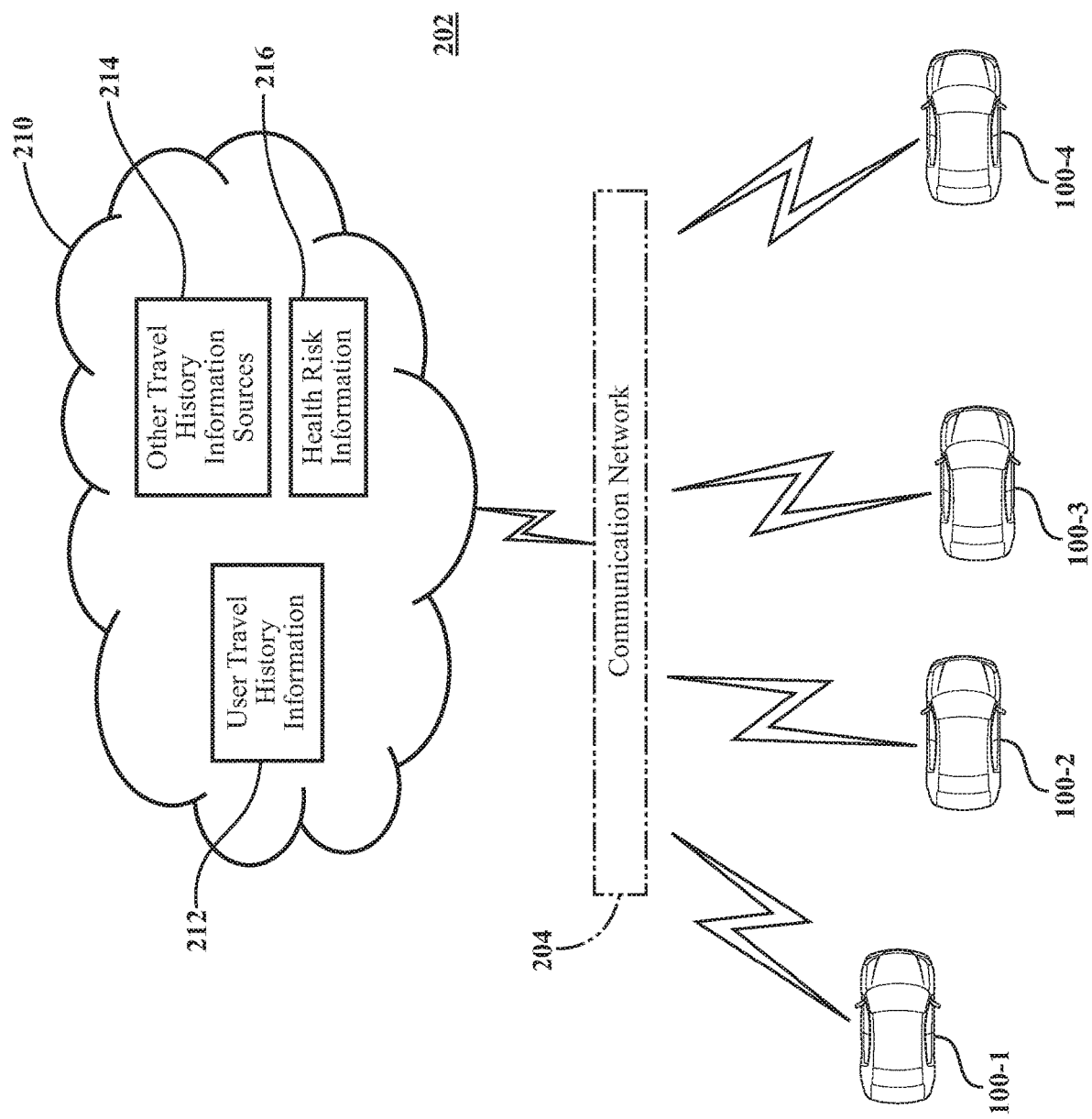
FIG. 2 is schematic block diagram of a transportation system incorporating an embodiment of the health risk assessment system described herein.

FIG. 2 is schematic block diagram of a transportation system 202 incorporating an embodiment of the health risk assessment system described herein. The health risk assessment system may be configured to estimate a health risk posed by transporting a user in a vehicle. The estimated health risk may arise from the possibility that the user is infected with and/or contagious with a communicable disease. As used herein, the term "communicable disease" means an infectious disease (such as cholera, hepatitis, influenza, malaria, measles, COVID-19, tuberculosis, etc.) that is transmissible by contact with infected individuals or their bodily discharges or fluids (such as respiratory droplets, blood, or semen), by contact with contaminated surfaces or objects, by ingestion of contaminated food or water, or by direct or indirect contact with disease vectors (such as mosquitoes, fleas, or mice). The estimated health risk may be to current additional occupants of the vehicle, such as shared riders or a human driver of the vehicle breathing in and (exhaling into) the same vehicle interior atmosphere as the user. The estimated health risk may also be to future occupants of the vehicle, for example, in a case where the user touches vehicle interior surface(s) and bacteria/viruses carried by the user are deposited on the surface(s).

FIG. 2 shows a system including multiple vehicles 100-1, 100-2, 100-3, and 100-4 configured as shown in FIG. 1 for performing the user health assessments and other operations described herein. These vehicles may form only a portion of the vehicles incorporated into the transportation system 202. The transportation system 202 may include vehicles providing one or more types of services directed to transporting users (i.e., a Maas (mobility as a service) vehicle)). Thus, the vehicles of the system 202 may be rental vehicles (to be driven by the user) or vehicle in which one or more users are driven by a separate driver. Any of the vehicles may also be a fully autonomous (i.e., self-driving) vehicle. Therefore, a "user" may be any occupant of a vehicle in which at least a portion of a health risk assessment system as described herein resides, or to which a portion of the health risk assessment system is operably coupled. As an occupant of the vehicle, the user may be a driver of the vehicle (e.g., where the vehicle is a rental car), a passenger in a vehicle driven by a separate human driver (for example, a Maas vehicle such as Uber, Lyft, etc.), or a passenger in a fully autonomous vehicle. A "user" may also be an occupant who is acting as a driver for one or more other occupants.

The user travel history information database 212 may store vehicle reservation and scheduling information, and may be configured to handle vehicle scheduling by coordinating the availability of individual vehicles with ride times requested by prospective users. The user travel history information database 212 may store personal information regarding past and prospective users of vehicles in the system 202. Such information may include name, address, and other personal information. The database 212 may record information regarding each ride taken by each user in any vehicle of the transportation system 202. Optionally, the database 212 may also store information regarding rides taken in vehicle which are not part of the system 202. The ride information may be indexed by user, and may also be searchable and/or indexable based on any other desired criteria. Stored information on rides may include such elements as an identification of each vehicle used, the date and time period(s) during which the ride(s) in each vehicle occurred, disinfection records (dates, times, etc.) for each vehicle, dates and times of all vehicle starts and stops, whether any previous ride including the user was shared with one or more other people, the names and addresses of any users and other riders (including shared riders), the location(s) and times at which any shared rider(s) were picked up during the shared ride, information (names, addresses, dates and times of use, etc.) regarding any rider(s) who used the other vehicle alone prior to use of the vehicle by the user, and any other information pertinent to the travel history of a user and travel paths taken by the vehicle. The user travel history information database 212 may be stored on the cloud 210 or in a facility configured for communication with individual vehicles 100-1, 100-2, 100-3, 100-4 in the transportation system. Travel history information and related may also (or alternatively) be stored on other travel history information sources (collectively designated 214) either on or off the cloud 210.

The health risk information database 216 may store information relating to the occurrence of infectious disease cases, for one or more infectious diseases. In one or more arrangements, the database 216 may store information relating to the occurrence of infectious disease cases in particular geographical area(s) serviced by the vehicles of the transportation system. For example, embodiments of the health risk assessment module 113 described may be configured to interface with the health risk information database 216 to acquire available information relating to disease outbreaks in areas where the vehicles 100 are scheduled to go in the future, where the vehicles have stopped, where vehicle occupants (including drivers) live, etc. The database 216 may be configured to acquire, store and correlate historical and/or time-based information regarding the incidence of disease in geographical areas, so that increasing and/or decreasing rates of infection in an area may be discerned from the data. Pertinent disease information may be organized by geographical area or using any other desired criteria. The health risk information database 216 may be configured to acquire (from any available source), organize, store, and/or process any type of information related to one or more communicable diseases.

Information from the health risk information database 216 may be correlated with the travel history information stored in the user travel information database 212 to determine information such as high infection-potential areas for future travel and areas where infection rates have dramatically increased in a short period of time leading to the present. For example, health risk information database 216 may contain information indicating that the incidence of a particular communicable disease has spiked in a particular geographical area. The health risk assessment module 113 may correlate this information with information from the user travel history information database 212 indicating that a user scheduled to travel in a vehicle of the transportation system resides in the geographical area. Based on this correlation, the health risk assessment module 113 may determine a relatively higher value for the first health status parameter as described herein (i.e., the calculated value for the first health status parameter may be higher in such a case than in a situation where the prospective user lives in an area with a lower incidence of disease). Thus, using information from the health risk information database 216 and the user travel history information database 212, a first health status parameter for a user as described herein may be determined based on the user's latest travel history, at any time up to the time of the user's scheduled ride in the vehicle 100.

Vehicles 100-1, 100-2, 100-3, and 100-4 may communicate with cloud resources 212, 214, 216 via a suitable known wireless communications network 204, via a vehicle wireless communications interface 169 incorporated into the vehicle 100.

Figure 3:
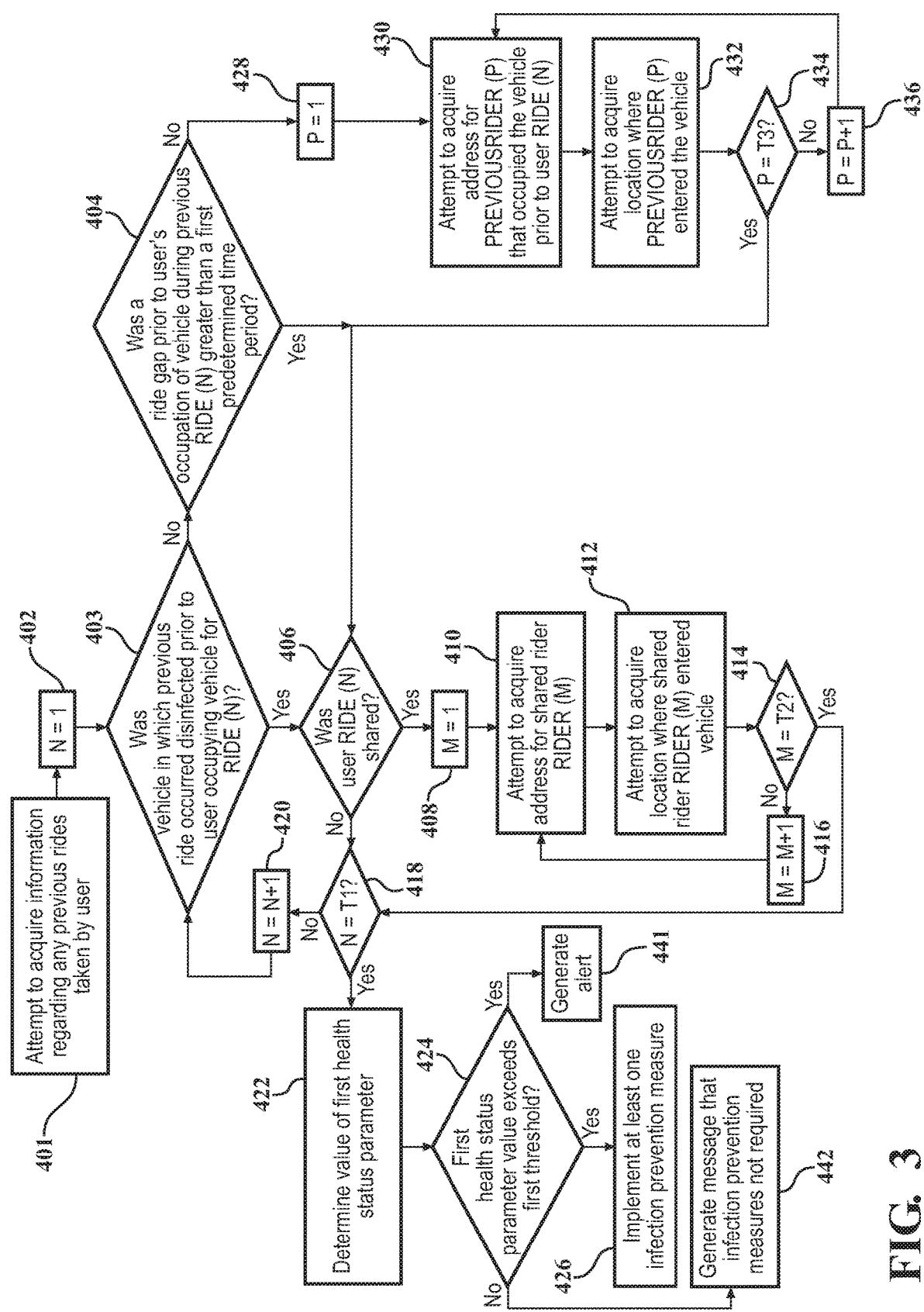
FIG. 3 is a flow diagram illustrating operation of an embodiment of the health risk assessment system in determining a first health status parameter and determining if a need exists for infection prevention measures based on the value of the first health status parameter.

FIG. 3 is a flow diagram illustrating operation of an embodiment of the health risk assessment system and health risk assessment module 113. Acquisition and evaluation of user travel history information may be performed at any time prior to the user entering the vehicle for a scheduled ride. In operation, after a user has scheduled a ride in the vehicle 100, the health risk assessment module 113 may (in block 401) attempt to acquire information regarding any previous rides taken by the user. Information relating to the user's previous rides (if any) may be downloaded as a batch, or the health risk assessment module 113 may interact with the various databases and other sources to attempt to acquire information as needed. Any information acquired may be either flagged for analysis purposes or stored in associated locations in one or more memories for access during data processing.

If records of previous rides of the user are found, the health risk assessment module 113 may (in block 402) initialize a previous ride counter N at N=1 for purposes of analyzing user travel history information acquired from the vehicle travel information database and/or other sources. For each previous ride taken by the user, the health risk assessment module 113 may attempt to acquire or determine the types of information previously described. The previous ride N=1 may represent a most recent ride of the user. Counter values of N=2, N=3, etc., may represent consecutive previous rides taken progressively farther back in time.

The variable T1 may represent the total number of previous rides the user has taken in vehicles registered with the transportation system 202 over a selected sample time period. In one or more arrangements, the sample time period may be, for example two weeks or one month. More recent rides of the user may be more relevant to disease transmissibility due to disease incubation and surface contagion periods. Rides that occurred farther in the past may be less relevant because any infected vehicle interior surfaces may no longer be contagious and/or because the user, if previously infected, may have developed symptoms and recovered and may no longer be personally contagious at the time of the currently scheduled ride. The length of the sample time period may depend on the particular communicable disease.

Starting in block 403, the health risk assessment module 113 may attempt to determine from the travel history information for a previous ride RIDE (N) if the vehicle in which the RIDE (N) occurred was disinfected prior to the user occupying vehicle for the ride. For this assessment, the health risk assessment module 113 may attempt to determine from vehicle records if the vehicle in which the previous ride occurred was disinfected after being occupied by a last occupant of the vehicle prior to the user occupying the vehicle for the RIDE (N). If information regarding whether or not the vehicle was disinfected is not available, the health risk assessment module 113 may assume that the vehicle was not disinfected after being occupied by a last occupant of the vehicle prior to the user occupying the vehicle for the RIDE (N). In this case, control would transfer to block 404.

If the vehicle in which the RIDE (N) occurred was not disinfected prior to the user occupying the vehicle for the ride, the health risk assessment module 113 may (in block 404) attempt to determine from the travel history information if a ride gap prior to the user's occupation of the vehicle during the previous RIDE (N) was greater than a first predetermined time period. If information regarding whether or not the ride gap exceeded the first predetermined time period is not available, the health risk assessment module 113 may assume that the ride gap did not exceed the first predetermined time period. In this case, control would transfer to block 428.

If the ride gap for RIDE(N) prior to the user's occupation of the vehicle during the RIDE(N) was greater than the first predetermined time period, the health risk assessment module may (in block 406) attempt to determine from the travel history information if the user shared the RIDE(N) with one or more other person(s). If information regarding whether or not the ride RIDE (N) was shared is unavailable, the health risk assessment module may assume that RIDE (N) was not shared. Control may then pass to block 418. However, if the user shared the RIDE(N) with one or more other person(s), the health risk assessment module 113 may (in block 408) initialize at M=1 a shared rider counter M usable for acquiring, processing and/or storing travel history information regarding each individual person who shared the RIDE (N) with the user. The variable T2 may represent to total number of other person(s) that shared RIDE (N) with the user.

The health risk assessment module 113 may then (in block 410) attempt to determine, from the travel history information, the address of the shared rider RIDER (M) during RIDE (N). The health risk assessment module may then (in block 412) attempt to determine, from the travel history information, the location where the shared RIDER (M) entered the vehicle during the shared RIDE (N). The health risk assessment module 113 may then (in block 414) compare the shared rider counter value M with the total number T2 of shared riders. If the values of M and T2 are not equal, the health risk assessment module may (in block 416) increment the shared rider counter M, after which the blocks 410 and 412 may be repeated for the next shared rider RIDER (M) (if any). This process may continue until pertinent information has been acquired for all of the people who shared the ride (RIDE (N) with the user.

The address of the shared rider and the location where the shared rider entered the vehicle may be cross-referenced with information from the health risk information database 216 to determine the disease infection rates in the these geographical areas and to acquire any other pertinent information relating to occurrences of a disease in the areas. This information may be factored into the determination of the first health status parameter, with relatively high infection rates, death rates, etc. in a geographical area tending to increase the value of the first health status parameter and relatively low infection rates, death rates, etc. in a geographical area tending to decrease the value of the first health status parameter.

If information such as a name, address, vehicle entry location, etc. for a shared rider is unavailable, the information may be flagged as unavailable in memory. Unavailability of the information may cause the determined value of the first health status parameter to be relatively higher because the health risk assessment module 113 may be configured to assume that any person for which information is missing may have been infected and may have contributed to potential infection of the user, either through contact (direct or indirect) or by touching interior surfaces of the vehicle. Also, if any information needed for analysis of any of the factors described herein is found by the health risk assessment module to be unknown or unavailable, the health risk assessment module 113 may control operation of the vehicle to generate a message configured to be perceivable to a human observer and indicating that at least some of the information needed to perform a complete analysis is unavailable, and that the analysis results presented were determined using incomplete information. However, to varying degrees as selected by a manufacturer or other entity configuring the health risk assessment module 113 for operation, the algorithm used to calculate the first health status parameter may be skewed toward a more cautious or conservative assessment of the risk of infection from transporting the user in the vehicle 100. Thus, the module 113 may be configurable to assume a "worst-case" scenario in any situation in which pertinent information is missing. For example, instead of assuming that a previous ride of the user was not shared if information regarding sharing of the ride is unavailable, the algorithm may be configured to assume (as a worst-case) that the ride was shared with at least one other person.

Returning to block 414, if the values of M and T2 are equal, then all shared riders have been accounted for, and control may transfer to block 418, where the value of the ride counter N is compared with the value of T1 (the total number of previous rides the user has taken). If N<T1, the counter N may be incremented (in block 420) to acquire information for the user's next most recent ride. Control may then proceed to block 403 previously described. However, if N=T1 in block 418, all of the user's previous rides have been accounted for and available information relating to the rides gathered. Then, control may pass to block 422 where the health risk assessment module 113 may use the travel history information acquired and determined in the steps previously described to calculate or determine the value of the first health status parameter.

The health risk assessment module 113 may then (in block 424) compare the value of the first health status parameter with the first threshold value. If the value of the first health status parameter does not exceed the value of the first threshold, the health risk assessment module 113 may (in block 442) control operation of the vehicle so as to generate a message configured to be perceivable by a human observer and to indicate that an analysis of the available information indicates that infection prevention measures do not appear to be required. However, if the value of the first health status parameter exceeds the value of the first threshold, health risk assessment module may (in block 426) control operation of the vehicle to implement at least one infection prevention measure. In addition to (or alternatively to) block 426, the health risk assessment module 113 may (in block 441) control operation of the vehicle so as to generate a message configured to be perceivable by a human observer and to indicate that infection prevention measures are recommended. The message may contain options or specific recommendations for infection prevention measures to be taken by a human observer, such as a driver or vehicle service personnel. The message may be configured to inform a human observer of one or more infection prevention measure(s) than the vehicle plans to take autonomously after the user has completed the scheduled ride. The message may be configured to provide any of a variety of other information.

Returning to block 406, if the user did not share the RIDE(N) with one or more other person(s), control may transfer to block 418 (previously described), where the previous ride number may be determined and incremented (block 420) if necessary.

Returning to block 404, if the ride gap for RIDE(N) prior to the user's occupation of the vehicle during the previous RIDE(N) was not greater than the first predetermined time period, then bacteria or viruses deposited by an occupant of the vehicle prior to the user's previous ride may still be alive on vehicle interior surfaces. In this case, the health risk assessment module 113 may attempt to acquire information regarding all people who occupied the vehicle prior to the user's previous ride RIDE (N) (or the health risk assessment module may scan information already acquired for the desired information). In one or more arrangements, the variable T3 may represent the total number of people who occupied the vehicle prior to the user's previous ride RIDE (N) over a selected sample time period. In particular arrangements, the sample time period may be, for example two weeks or one month.

To attempt to acquire information regarding all people who occupied the vehicle prior to the user's previous ride RIDE(N), the health risk assessment module 113 may (in block 428) initialize a value of a "previous rider" counter P at P=1. Then, the health risk assessment module may (in block 430) attempt to acquire an address of a last rider PREVIOUSRIDER (P) of the vehicle prior to the user's previous ride in the vehicle. The health risk assessment module may also (in block 432) attempt to acquire a location where the rider PREVIOUSRIDER (P) entered the vehicle.

An acquired address and vehicle entry location of the previous may be correlated and evaluated with respect to geographical data acquired from the health risk information module, as previously described. This information may then be factored into the determination of the first health status parameter in block 422. Thus, for example, if the previous rider lives in a relatively high infection-rate area and/or entered the vehicle in a relatively high infection-rate area, this may tend to increase the value of the first health status parameter. Conversely, if the previous rider lives in a relatively low infection-rate area and/or entered the vehicle in a relatively low infection-rate area, this may tend to decrease the value of the first health status parameter.

In block 434, the value of the previous rider counter P may be compared with the value of T3. If P<T3, the previous rider counter may be incremented in block 436. Control may then transfer back to block 430, where blocks 430 and 432 will be executed for the next most recent PREVIOUSRIDER (P). This procedure may be repeated until pertinent travel history information has been acquired for all previous riders. However, if P=T3, available information regarding all people who occupied the vehicle prior to the user's previous ride RIDE(N) should have been acquired. In this case, control may transfer to block 406, where the health risk assessment module may consider if the user's previous ride RIDE (N) was shared, as previously described. Operation of the health risk assessment module may proceed from block 406 as previously described.

Figure 4:
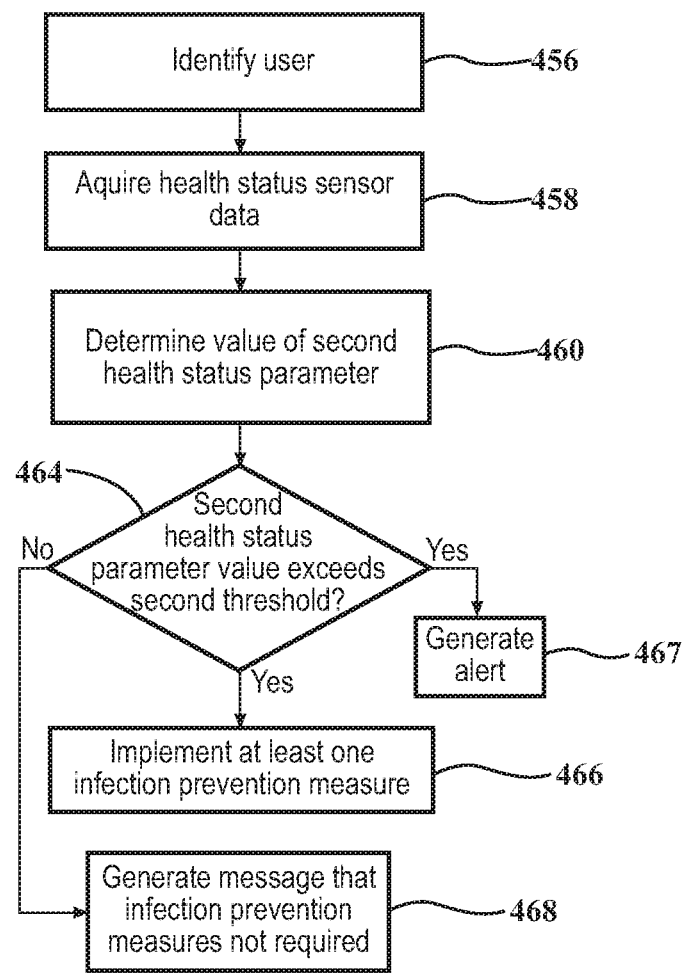
FIG. 4 is a flow diagram illustrating operation of an embodiment of the health risk assessment system in determining a second health status parameter and determining if a need exists for infection prevention measures based on the value of the second health status parameter.

Referring now to FIG. 4, the health risk assessment module 113 may also include computer-readable instructions that when executed by the one or more processors cause the one or more processors to, using data from vehicle health status sensors, determine a value of a second health status parameter. The second health status parameter may represent an estimated likelihood that that the user is currently infected with an infectious illness. Factors detectible by vehicle health status sensors that may increase the calculated value of the second health status parameter include detection of an elevated temperature of the user, detection of excessive sneezing and/or coughing, excessive agitation of "fidgeting" which may indicate discomfort, etc.

In block 456, the health risk assessment module 113 may attempt to identify the user prior to or after the user enters the vehicle 100, but prior to commencement of the ride. Whether or not the user is the user scheduled for the pending ride, the health risk assessment module may generate a health status file or directory (associated with the particular user) in which health status sensor information and related calculations may be stored.

In block 458, the health risk assessment module 113 may attempt to acquire data from the vehicle health status sensors. The health risk assessment module may (in block 460) process any acquired health status sensor data to determine a value of the second health status parameter. The health risk assessment module may then (in block 464) compare the value of the second health status parameter to a second threshold. Responsive to the value of the second parameter exceeding the second threshold, the health risk assessment module 113 may (in block 466) control operation of the vehicle to implement at least one infection prevention measure, as previously described. For example, if the user is determined to be feverish, the health risk assessment module may recommend driving the vehicle to a disinfecting facility after the user has left the vehicle. In addition (or alternatively) to block 466, if the value of the first health status parameter exceeds the value of the first threshold, the health risk assessment module may (in block 467) control operation of the vehicle so as to generate a message configured to be perceivable by a human observer and to indicate that infection prevention measures are recommended.

If the value of the second parameter does not exceed the second threshold, operation of the vehicle may be controlled to (in block 468) generate a message configured to be perceivable by a human observer and to indicate that an analysis of the information indicates that generate message that infection prevention measures do not appear to be required.

Any of a variety of schemes may be used to weight and process available information for calculating values for the first and second health status parameters. One simplified scheme (i.e., without weighting) for determining a value for the first health status parameter is discussed herein, to illustrate the basic principles involved and to show how variations in different types of data may affect the determined values of the health status parameters.

In one scheme, a value for the first health status parameter may be determined based on the presence of a specific condition in the ride history. If desired, a specific weight may also be assigned to each condition. Any acquired data, variable values, etc. used in calculating a value of a first and second health status parameters may be weighted to attach a relatively greater or lesser significance to the data depending on such factors as, for example, perceived accuracy and/or uncertainty of the data, volume of available data, correlations between a particular type of data and actual user infection rates, and other factors.

For example, referring to FIG. 3, factors tending to increase the value of the first health status parameter may include the fact that vehicle was not disinfected prior to the user's previous ride (block 403), whether or not a ride gap exceeded a predetermined time period (block 404), and whether or not the user shared any previous rides (block 406). For each rider the user shared a previous ride with, factors tending to increase the value of the first health status parameter may include a shared rider address in a high disease-incidence zone (block 410) and a shared rider vehicle entry location in a high disease-incidence zone (block 412). For each previous rider of the vehicle in a case where a ride gap<predetermined time period, factors tending to increase the value of the first health status parameter may include a previous rider address in a high disease-incidence zone (block 430) and a previous rider vehicle entry location in a high disease-incidence zone (block 432). Each of these conditions may be assigned a value of 1 if the condition is present and 0 if the condition is not present. Combining these factors, for a user having a single previous ride during a sample time period, in a disinfected vehicle (block 403, condition value=0) with no shared riders in the previous ride (block 406, condition value=0), the value of the first health status parameter may be "0". In contrast, for a user having a single previous ride in a non-disinfected vehicle (block 403, condition value=1) where the ride gap<predetermined time period (block 404, condition value=1) and where the vehicle of the previous ride had one previous rider with an address and a vehicle entry location in a high-incidence zone (block 430, condition value=1 and block 432, condition value=1), the value of the first health status parameter may be 1+1+1+1=4. If this value is compared with a first threshold having a value of 3, the health status assessment module may determine that one or more infection prevention measures are desirable.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory (such as memory 111) generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A health risk assessment system comprising:
a processor; and
a memory communicably coupled to the processor and storing a health risk assessment module including computer-readable instructions that when executed by the processor cause the processor to:
acquire information regarding a travel history of a user of the vehicle;
determine, for each other person the user shared a previous ride with, a location at which the other person entered the vehicle in which the previous ride occurred and an address of the other person;
determine a first incidence of a communicable disease, at the location;
determine a second incidence of the communicable disease, at the address;
using the travel history information, the first incidence and the second incidence, determine a value of a first health status parameter;
determine whether the value of the first health parameter exceeds a first threshold; and
responsive to a determination that the value of the first health status parameter exceeds the first threshold, control operation of the vehicle to autonomously drive the vehicle to a facility for disinfection after a ride including the user has been completed.

2. The health risk assessment system of claim 1, wherein the assessment module includes computer-readable instructions that when executed by the processor cause the processor to acquire, for each previous ride the user took, information regarding whether or not the user shared the previous ride with any other person(s).

3. The health risk assessment system of claim 1, wherein the health risk assessment module includes computer-readable instructions that when executed by the processor cause the processor to:
using data from vehicle health status sensors, determine a value of a second health status parameter representing an estimated likelihood that that the user is currently infected with an illness;
determine that the value of the second health parameter exceeds a second threshold; and
responsive to a determination that the value of the first health status parameter does not exceed the first threshold and the determination that the value of the second health status parameter exceeds the second threshold, control operation of the vehicle to implement at least one infection prevention measure.

4. A health risk assessment system comprising:
a processor; and
a memory communicably coupled to the processor and storing a health risk assessment module including computer-readable instructions that when executed by the processor cause the processor to:
acquire information regarding a travel history of a user of the vehicle;
determine, for each previous ride the user took in any vehicle, a location at which each other person who rode in the vehicle prior to the previous ride entered the vehicle, and an address of the other person;
determine a first incidence of a communicable disease, at the location;
determine a second incidence of the communicable disease, at the address;
using the travel history information, the first incidence and the second incidence, determine a value of a first health status parameter;
determine whether the value of the first health parameter exceeds a first threshold; and
responsive to a determination that the value of the first health status parameter exceeds the first threshold, control operation of the vehicle to autonomously drive the vehicle to a facility for disinfection after a ride including the user has been completed.

5. The health risk assessment system of claim 4, wherein the assessment module includes computer-readable instructions that when executed by the processor cause the processor to acquire information regarding each previous ride the user took in any vehicles during a selected sample time period.

6. The health risk assessment system of claim 4, wherein the assessment module includes computer-readable instructions that when executed by the processor cause the processor to determine, for each previous ride the user took, if a time period between user occupation of a vehicle in which the previous ride occurred and a last occupation of the vehicle in which the previous ride occurred by another person prior to the user's previous ride was greater than a first predetermined time period.

7. The health risk assessment system of claim 4, wherein the assessment module includes computer-readable instructions that when executed by the processor cause the processor to determine, for each previous ride the user took, if a vehicle in which the previous ride occurred was disinfected after being occupied by a last occupant of the vehicle in which the previous ride occurred prior to the user occupying the vehicle in which the previous ride occurred.

8. The health risk assessment system of claim 4, wherein the health risk assessment module includes computer-readable instructions that when executed by the processor cause the processor to:
using data from vehicle health status sensors, determine a value of a second health status parameter representing an estimated likelihood that that the user is currently infected with an illness;
determine that the value of the second health parameter exceeds a second threshold; and
responsive to a determination that the value of the first health status parameter does not exceed the first threshold and the determination that the value of the second health status parameter exceeds the second threshold, control operation of the vehicle to implement at least one infection prevention measure.

9. The health risk assessment system of claim 8, wherein the at least one infection prevention measure comprises autonomously driving the vehicle to a facility for disinfection after the user has left the vehicle.

10. The health risk assessment system of claim 4, wherein the assessment module includes computer-readable instructions that when executed by the processor cause the processor to generate an automated message to a scheduling facility canceling a scheduled vehicle rental or a ride of a prospective user if a first health status parameter associated with the user is determined to exceed a first threshold.

11. A transportation system comprising a health risk assessment system in accordance with claim 4.

12. A non-transitory computer-readable medium for determining a requirement for, and implementing, an infection prevention measure in a vehicle and storing instructions that when executed by a processor cause the processor to:
acquire information regarding a travel history of the user;
determine, for each previous ride the user took in any vehicle, a location at which each other person who rode in the vehicle prior to the previous ride entered the vehicle, and an address of the other person;
determine a first incidence of a communicable disease, at the location;
determine a second incidence of the communicable disease, at the address;
using the travel history information, the first incidence and the second incidence, determine a value of a first health status parameter;
determine that the value of the first health parameter exceeds a first threshold; and
responsive to the determination that the value of the first health status parameter exceeds the first threshold, control operation of the vehicle to autonomously drive the vehicle to a facility for disinfection after a ride including the user has been completed.

13. A method for determining a requirement for, and implementing, an infection prevention measure in a vehicle, the method comprising steps of:
acquiring information regarding a travel history of the user;
for each other person the user shared a previous ride with, determining a location at which the other person entered the vehicle in which the shared ride occurred, and an address of the other person;
determining a first incidence of a communicable disease, at the location;
determining a second incidence of the communicable disease, at the address;
using the travel history information, the first incidence and the second incidence, determining a value of a first health status parameter;
determining that the value of the first health parameter exceeds a first threshold;
responsive to the determination that the value of the first health status parameter exceeds the first threshold, controlling operation of the vehicle to autonomously drive the vehicle to a facility for disinfection after a ride including the user has been completed.

14. The method of claim 13, wherein the step of determining a value of a first health status parameter comprises a step of acquiring information regarding each previous ride the user took in any vehicles during a selected sample time period.

15. The method of claim 14, wherein the step of determining a value of a first health status parameter comprises a step of determining, for each previous ride the user took, information regarding whether a time period between a user occupation of a vehicle in which the previous ride occurred and a last occupation of the vehicle in which the previous ride occurred by another person prior to the user's previous ride was greater than a first predetermined time period.

16. The method of claim 14, wherein the step of determining a value of a first health status parameter comprises a step of determining, for each previous ride the user took, information regarding whether a vehicle in which the previous ride occurred was disinfected after being occupied by a last occupant of the vehicle in which the previous ride occurred prior to the user occupying the vehicle in which the previous ride occurred.

17. The method of claim 16, wherein the step of determining a value of a first health status parameter comprises a step of acquiring, for each previous ride the user took, information regarding whether or not the user shared the previous ride with any other person(s).

18. A method for determining a requirement for, and implementing, an infection prevention measure in a vehicle, the method comprising steps of:
acquiring information regarding a travel history of the user;
determining, for each previous ride the user took in any vehicle, a location at which each other person who rode in the vehicle prior to the previous ride entered the vehicle, and an address of the other person;
determining a first incidence of a communicable disease, at the location;
determining a second incidence of the communicable disease, at the address;
using the travel history information, the first incidence and the second incidence, determining a value of a first health status parameter;
determining whether the value of the first health parameter exceeds a first threshold;
responsive to the determination that the value of the first health status parameter exceeds the first threshold, controlling operation of the vehicle to autonomously driving the vehicle to a facility for disinfection after a ride including the user has been completed.

19. The method of claim 18, further comprising the steps of:
using data from vehicle health status sensors, determining a value of a second health status parameter representing an estimated likelihood that that the user is currently infected with an illness;
determining that the value of the second health parameter exceeds a second threshold; and
responsive to a determination that the value of the first health status parameter does not exceed the first threshold and the determination that the value of the second health status parameter exceeds the second threshold, control operation of the vehicle to implement at least one infection prevention measure.

* * * * *